US007021737B2

(12) United States Patent
Yamada

(10) Patent No.: US 7,021,737 B2

(45) Date of Patent: Apr. 4, 2006

(54) IMAGE FORMING APPARATUS

(75) Inventor: Masatoshi Yamada, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 193 days.

(21) Appl. No.: 10/670,336

(22) Filed: Sep. 26, 2003

(65) Prior Publication Data

US 2004/0061767 A1 Apr. 1, 2004

(30) Foreign Application Priority Data

Sep. 30, 2002 (JP) ............................ 2002-285335

(51) Int. Cl.
*B41J 29/393* (2006.01)
*H04N 1/46* (2006.01)

(52) U.S. Cl. .......................... 347/19; 347/41; 358/504

(58) Field of Classification Search ................. 347/19, 347/41, 16; 358/504

See application file for complete search history.

(56) References Cited

U.S. PATENT DOCUMENTS

| | | | |
|---|---|---|---|
| 6,304,278 B1 * | 10/2001 | Coleman | 347/110 |
| 6,439,684 B1 | 8/2002 | Yoshimura et al. | |
| 6,450,606 B1 * | 9/2002 | Kato et al. | 347/19 |
| 6,769,759 B1 * | 8/2004 | Yamasaki et al. | 347/41 |
| 2002/0175966 A1 | 11/2002 | Yoshimura et al. | |

FOREIGN PATENT DOCUMENTS

| | | |
|---|---|---|
| JP | 5-096796 | 4/1993 |
| JP | 8-085242 | 4/1996 |
| JP | 11-020248 | 1/1999 |
| JP | 2000-153660 | 6/2000 |
| JP | 2001-001584 | 1/2001 |

OTHER PUBLICATIONS

Extract Translation of the Notification of Reasons for Rejection of Japanese Patent Application No. 2002-285335.

Extract Translation of Publication of Unexamined Japanese Patent Application No. 2-1-001584.

* cited by examiner

*Primary Examiner*—Lamson Nguyen

(57) ABSTRACT

An image forming apparatus which corrects a transfer amount of a recording material without a scanner is provided. A paper is transferred to a position in which the transfer amount is adjusted by an LF roller, and a plurality of test pattern images, each of which is composed of a first pattern image and a second pattern image, are printed. Then, the paper is transferred to a position in which the transfer amount is adjusted by an exit roller, and the aforementioned plurality of test pattern images are printed. The plurality of test pattern images differ from each other in the transfer amount between printings of the first pattern image and the second pattern image. A degree of error in the transfer amount of the respective rollers can be visually observed. Accordingly, by receiving an input based on the printed test pattern images, it is possible to correct the transfer amount of the respective rollers.

12 Claims, 11 Drawing Sheets

IMAGE FORMING APPARATUS

BACKGROUND OF THE INVENTION i) Technical Field of the Invention

This invention relates to an image forming apparatus which records an image on a recording material being transferred.

ii) Description of the Related Art

In an image forming apparatus, such as an ink jet printer, which records an image on a recording material being transferred, techniques have been conventionally known in connection with correcting a transfer amount of the recoding material to record the image on the recording material with high precision.

Since many of serial ink jet printers repeat a record operation in a predetermined banding width and a transfer operation of paper in turn for printing, a difference between the predetermined banding width and the transfer amount of paper may cause deterioration in image quality such as gaps or overlaps between bands in the image. The above techniques have been developed to avoid such deterioration in image quality.

For example, the Unexamined Patent Publication No. 5-96796 discloses a technique of correcting the transfer amount of the recording material according to a correction value obtained by a calculation based on a test pattern image sample read by a scanner and recorded on the recording material.

Similarly, the Unexamined Patent Publication No. 8-85242 discloses a technique of transferring the recording material under an optimal transfer condition obtained from a calculation based on a predetermined pattern image read by a scanner portion and recorded on the recording material.

However, both of the aforementioned disclosures require a scanning function for reading a test pattern image. Therefore, there is a problem that a user cannot see whether the recording material is properly transferred in a printer without a scanning function.

SUMMARY OF THE INVENTION

One object of the present invention which was made to solve the above problem is to provide an image forming apparatus which allows a user to see whether a recording material is properly transferred without a scanning function.

In order to attain the above object, an image forming apparatus of the present invention comprises a transfer unit, and a record head having a plurality of record elements arranged thereon for recording dots on a recording material. The apparatus forms an image based on a transfer operation that makes the transfer unit transfer the recording material and a move operation that moves the record head to a direction orthogonal to a transfer direction of the recording material. The image forming apparatus further comprises a record control unit. The record control unit controls the transfer unit and record head to record a plurality of test pattern images side by side in the moving direction of the record head. The test pattern image is composed of a first pattern image and a second pattern image. In the plurality of test pattern images, an amount of the recording material transferred by the transfer unit between printings of the first pattern image and the second pattern image differs, respectively.

In the image forming apparatus of the present invention, since the plurality of test pattern images are recorded on the recording material side by side in the moving direction of the record head, a user can see whether the recording material is properly transferred and a space required for recording the plurality of test pattern images can be minimized. That is, if the plurality of test pattern images are recorded side by side in the transfer direction of the recording material, for example, an elongated space in the transfer direction of the recording material will be occupied by the test pattern images. If a large number of test pattern images have to be recorded, two or more recording materials are required. The image forming apparatus of the present invention allows the plurality of test pattern images to be fitted and recorded within a relatively small space. Therefore, only one recording material is required for the correction. Furthermore, since other images (such as other types of test pattern images, etc.) can be recorded together, saving of the recording material is enhanced.

The first pattern image may be the same as the second pattern image.

In the image forming apparatus of the present invention, the record control unit records the first pattern images comprised in the plurality of test pattern images without the transfer operation for transferring the recording material. Accordingly, the first pattern images in the plurality of test pattern images are recorded with a single move of the record head, and recording of the plurality of test pattern images can be completed in a short amount of time.

In the image forming apparatus of the present invention, the record control unit records the first pattern image using a first part of the record elements of the record head, and records the second pattern image using a second part of the record elements which is different in a position in the transfer direction of the recording material from the first part. According to such a constitution, not only the error in the amount transferred by the transfer unit but also an error in a distance between the first part and the second part in the transfer direction of the recording material are reflected in the test pattern image.

It is preferable that the first part and the second part are respective end parts of the record elements of the record head in the transfer direction of the recording material. Then, not only the error in the amount transferred by the transfer unit but also an error in the overall length of the record elements of the record head in the transfer direction of the recording material are reflected in the test pattern image. As a result, correction of the amount transferred by the transfer unit can also improve effects to the images caused by a difference in the overall length of the record elements in the transfer direction of the recording material.

In the image forming apparatus of the present invention, the record elements of the record head eject ink drops to form dots on the recording material. The record control unit records the test pattern image on the recording material only when the record head is moved to one predetermined direction. According to this constitution, the test pattern image is recorded on the recording material with high precision. The ink drops ejected from the record elements on the recording material are affected by the moving direction of the record head. Therefore, if the record head is moved to different directions during the recording without accurate correction, misalignment of dot positions may occur. Such a problem is not caused in the image forming apparatus of the present invention.

In the image forming apparatus of the present invention, the test pattern image is an image having a pattern which varies depending on the mount transferred by the transfer unit between recordings of the first pattern image and the second pattern image. In this constitution, a positional relation between the first pattern image and the second pattern image is visually observed without difficulty.

The image forming apparatus of the present invention further comprises an input unit and a correction unit. The input unit inputs a result of visual comparison between the respective test pattern images recorded on the recording material, and the correction unit corrects the amount of the recording material transferred by the transfer unit based on a comparison result inputted from the input unit.

According to such an image forming apparatus, an operator who intends to correct the amount transferred by the transfer unit can determine how much correction of the transfer amount is required by referring to the plurality of test pattern images.

In other words, since each of the test pattern images is formed according to the amount transferred by the transfer unit between recordings of the first pattern image and the second pattern image, the test pattern image is formed differently depending on a degree of error when there is an error in the amount transferred by the transfer unit.

For example, if the plurality of test pattern images are recorded side by side in such a way that the amount transferred by the transfer unit between recordings of the first pattern image and the second pattern image is increased or decreased by a predetermined amount, the test pattern image in a specific form (or a test pattern image which most closely resembles the specific form) in the plurality of test pattern images appears in a position relative to the degree of error in the amount transferred by the transfer unit.

Accordingly, the degree of error in the amount transferred by the transfer unit can be visually observed from the plurality of test pattern images, and thus the transfer amount can be corrected based on an input operation by the operator without providing a mechanism of reading the test pattern image from the recording material and calculating the error in the transfer amount.

In the image forming apparatus of the present invention, the transfer unit comprises an upstream transfer roller that transfers the recording material on an upstream side of the record head and a downstream transfer roller that transfers the recording material on a downstream side of the record head. The record control unit records the plurality of test pattern images in an area of the recording material in which the recording material is transferred only by the downstream transfer roller, and the correction unit corrects the amount transferred by the downstream transfer roller. According to the above constitution, it is possible to save the recording material required for recording the plurality of test pattern images in which the error in the amount transferred by the downstream transfer roller is reflected. Among a space on the recording material in which the image is formed, the area in which the recording material is transferred only by the downstream transfer roller is narrow in the transfer direction of the recording material. Therefore, if the plurality of test pattern images are recorded on the recording material side by side in the transfer direction of the recording material as above, it is difficult to record the plurality of test pattern images within the space, and thus a number of recording materials may be necessary. However, the image forming apparatus of the present invention records the plurality of test pattern images on the recording material side by side in the moving direction of the record head. Such a constitution does not require a vast extent in space in the transfer direction of the recording material. Therefore, it is possible to record the plurality of test pattern images on one recording material, for example, and thus saving of the recording material is enhanced.

It is preferable that the record control unit records the plurality of test pattern images in an area of the recording material in which the recording material is transferred only by the upstream transfer roller or by both of the upstream transfer roller and downstream transfer roller, and the correction unit comprises a first correction unit that corrects an amount transferred by the upstream transfer roller based on a first input operation and a second correction unit that corrects an amount transferred by the downstream transfer roller based on a second input operation. Then, it is possible to record on the same recording material the test pattern images which reflect the error in the amount transferred by the upstream transfer roller and the test pattern images which reflect the error in the amount transferred by the downstream transfer roller, and thus saving of the recording material is further enhanced. In this case, the first input operation corresponds to an input operation for correcting the amount transferred by the upstream transfer roller and the second input operation corresponds to an input operation for correcting the amount transferred by the downstream transfer roller.

In the image forming apparatus of the present inventions the transfer unit comprises a transfer roller that transfers the recording material, and the record control unit records the plurality of test pattern images at least in two rows in the transfer direction of the recording material in different phases of the transfer roller. This constitution enables correction of the amount transferred by the transfer roller even when a rotation shaft of the transfer roller is eccentric. That is, if the rotation shaft of the transfer roller is eccentric, the transfer amount may be changed depending on the phase (rotation angle) of the transfer roller. Appropriate correction is difficult when the plurality of test pattern images are recorded only in one row. The image forming apparatus of the present invention records the plurality of test pattern images in two rows at an interval of 180° rotation of the transfer roller or in three rows at intervals of 120° rotation of the transfer roller, for example, to reflect the error in the transfer amount according to the phase of the transfer roller. Consequently, the transfer amount can be appropriately corrected using an average of errors observed in the respective rows of the plurality of test pattern images recorded in multiple rows, for example.

Another aspect of the present invention provides a recording method of test pattern images in an image forming apparatus. The image forming apparatus is provided with a transfer unit and a record head having a plurality of record elements arranged thereon for recording dots on a recording material. The apparatus forms an image based on a transfer operation that makes the transfer unit transfer the recording material and a move operation that moves the record head to a direction orthogonal to a transfer direction of the recording material. The method comprises a step of controlling the transfer unit and record head to record a plurality of test pattern images side by side in the moving direction of the record head. The test pattern image is composed of a first pattern image and a second pattern image. In the plurality of test pattern images, an amount of the recording material transferred by the transfer unit between printings of the first pattern image and the second pattern image differs, respectively.

Further aspect of the present invention provides a correction method of a transfer amount of a recording material in an image forming apparatus. The image forming apparatus is provided with a transfer unit and a record head having a plurality of record elements arranged thereon for recording dots on a recording material. The apparatus forms an image based on a transfer operation that makes the transfer unit transfer the recording material and a move operation that moves the record head to a direction orthogonal to a transfer direction of the recording material. The method comprises a step of controlling the transfer unit and record head to record a plurality of test pattern images side by side in the moving direction of the record head. The test pattern image is composed of a first pattern image and a second pattern image. The method further comprises steps of inputting a result of visual comparison between the respective test pattern images recorded on the recording material, and correcting the amount of the recording material transferred by the transfer unit based on the comparison result inputted from the input unit. In the plurality of test pattern images, an amount of the recording material transferred by the transfer unit between printings of the first pattern image and the second pattern image differs, respectively.

BRIEF DESCRIPTION OF THE DRAWING

The invention will now be described, by way of example, with reference to the accompanying drawings, in which.

DETAILED DESCRIPTION OF PREFERRED EMBODIMENT

Figure 1:
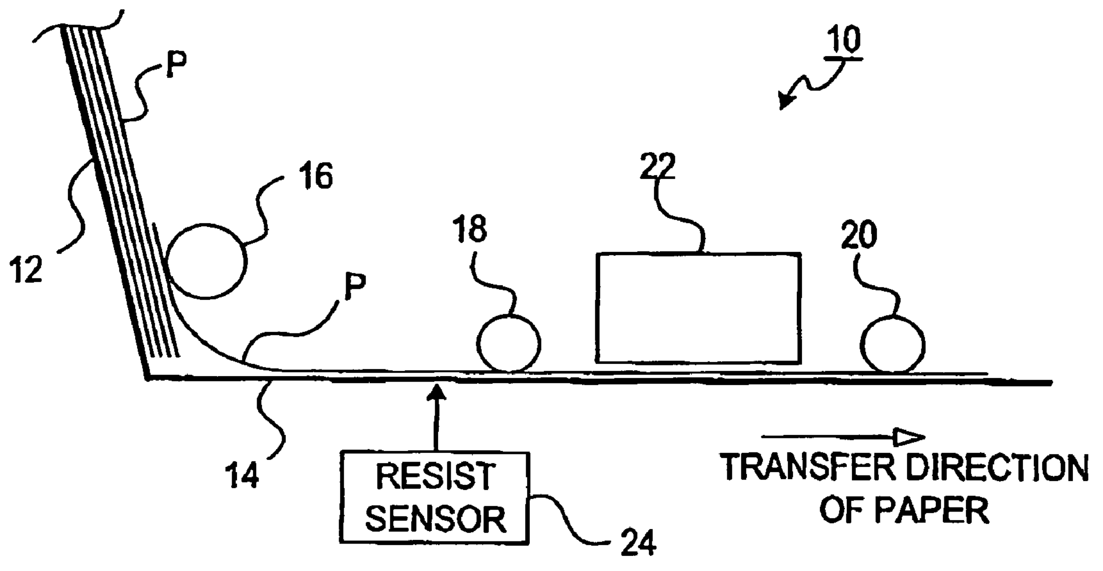
FIG. 1 is an explanatory view for describing an. internal constitution of an ink jet-printer of the present embodiment.

Referring to FIG. 1, an ink jet printer 10 comprises a feed roller 16, an LF roller 18, an exit roller 20, a record head 22 provided between the LF roller 18 and the exit roller 20, and a resist sensor 24. The feed roller 16 supplies a plurality of paper P loaded on a paper tray 12 to a paper transfer path 14 sheet by sheet. The LF roller 18 and exit roller 20 transfer the paper P along the paper transfer path 14. The resist sensor 24 detects a position of the transferred paper P (particularly, front and rear ends of the paper P) on an upstream side of the LF roller 18.

The LF roller 18 is provided upstream of the record head 22, and delivers the paper P transferred by the feed roller 16 to the record head 22.

Figure 2:
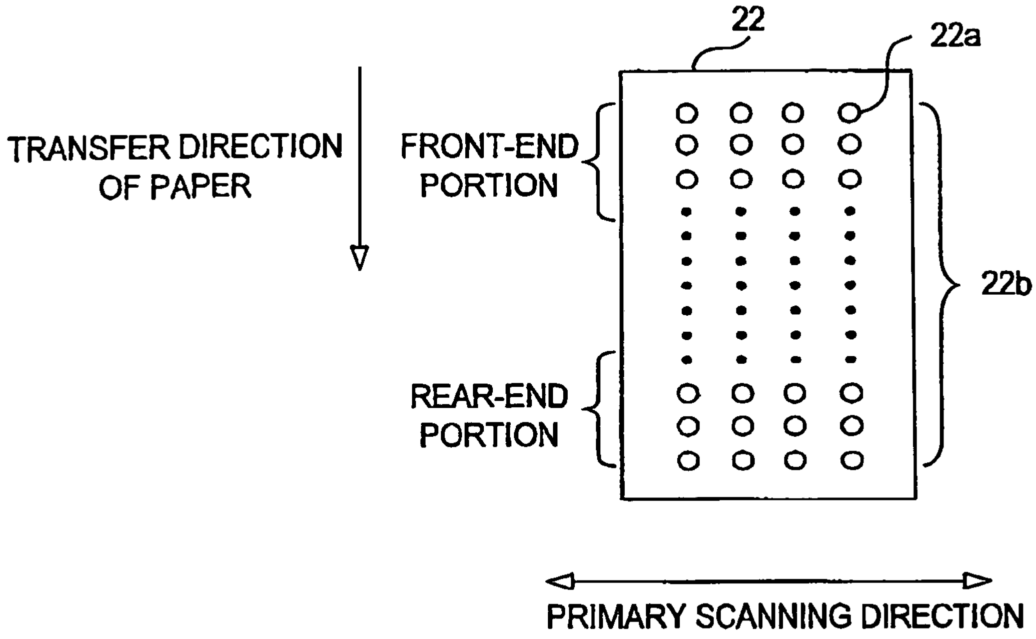
FIG. 2 is an explanatory view of a record head.

The exit roller 20 is provided downstream of the record head 22, and delivers the paper P transferred passing the record head 22 onto a not shown exit tray The record head 22 comprises a nozzle group **22*b* on a side of the paper P facing the paper transfer path 14. The nozzle group 22*b* is composed of a plurality of nozzles 22*a* which eject ink drops to form dots, as shown in FIG. 2. The nozzle group 22*b*** comprises four rows of nozzles lined up in a transfer direction of the paper P. Each row of the nozzles ejects ink drops of different colors (black, cyan, yellow and magenta).

The record head 22 is mounted on a not shown carriage which travels back and forth on a surface of the delivered paper P in a direction orthogonal (primary scanning direction) to the transfer direction (secondary scanning direction) of the paper P. The record head 22 moves along with the carriage.

Figure 3:
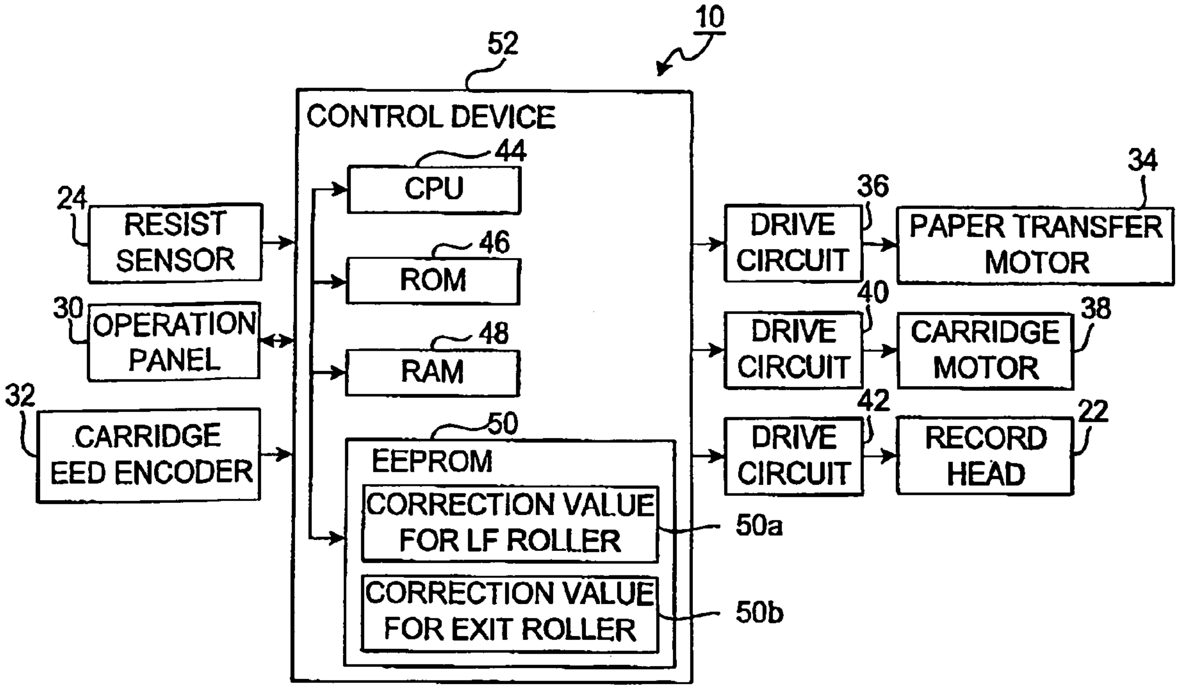
FIG. 3 is a block diagram showing an electrical constitution of the ink jet printer.

Now, an electrical constitution of the ink jet printer 10 is described by way of FIG. 3.

As shown in FIG. 3, the ink jet printer 10 comprises the aforementioned resist sensor 24, an operation panel 30, a carriage feed encoder 32, a paper transfer motor (pulse motor) 34, a drive circuit 36, a carriage motor 38, a drive circuit 40, the aforementioned record head 22, a drive circuit 42, and a control device 52 that includes known CPU 44, ROM 46, RAM 48 and EEPROM 50. The operation panel 30 is provided with keys for accepting an input from outside and a display for displaying a message, etc. to the outside. The carriage feed encoder 32 detects a position of the carriage. The paper transfer motor 34 rotates the feed roller 16, LF roller 18 and exit roller 20 by a rotation amount corresponding to an inputted pulse rotation number. The drive circuit 36 activates the paper transfer motor 34, the carriage motor 38 moves the carriage back and forth, the drive circuit 40 activates the carriage motor 88, and the drive circuit 42 makes the desired nozzle **22*a* in the nozzle group 22*b*** eject an ink drop.

The control device 62 performs a print process for printing (forming) a desired image on the paper P, based on an operation of ejecting ink drops while moving the record head 22 in the primary scanning direction and an operation of transferring the paper P by a predetermined transfer amount intermittently.

The transfer amount of the paper P during the printing process is defined by a rotation amount of the LF roller 18 or exit roller 20. Especially, when the paper P is in a position capable of being transferred by both of the LF roller 18 and exit roller 20, the transfer amount of the paper P is defined by the rotation amount of the LF roller 18. The exit roller 20 is only allowed to define the transfer amount of the paper P after the rear end of the paper P comes out of the LF roller 18.

Figure 10:
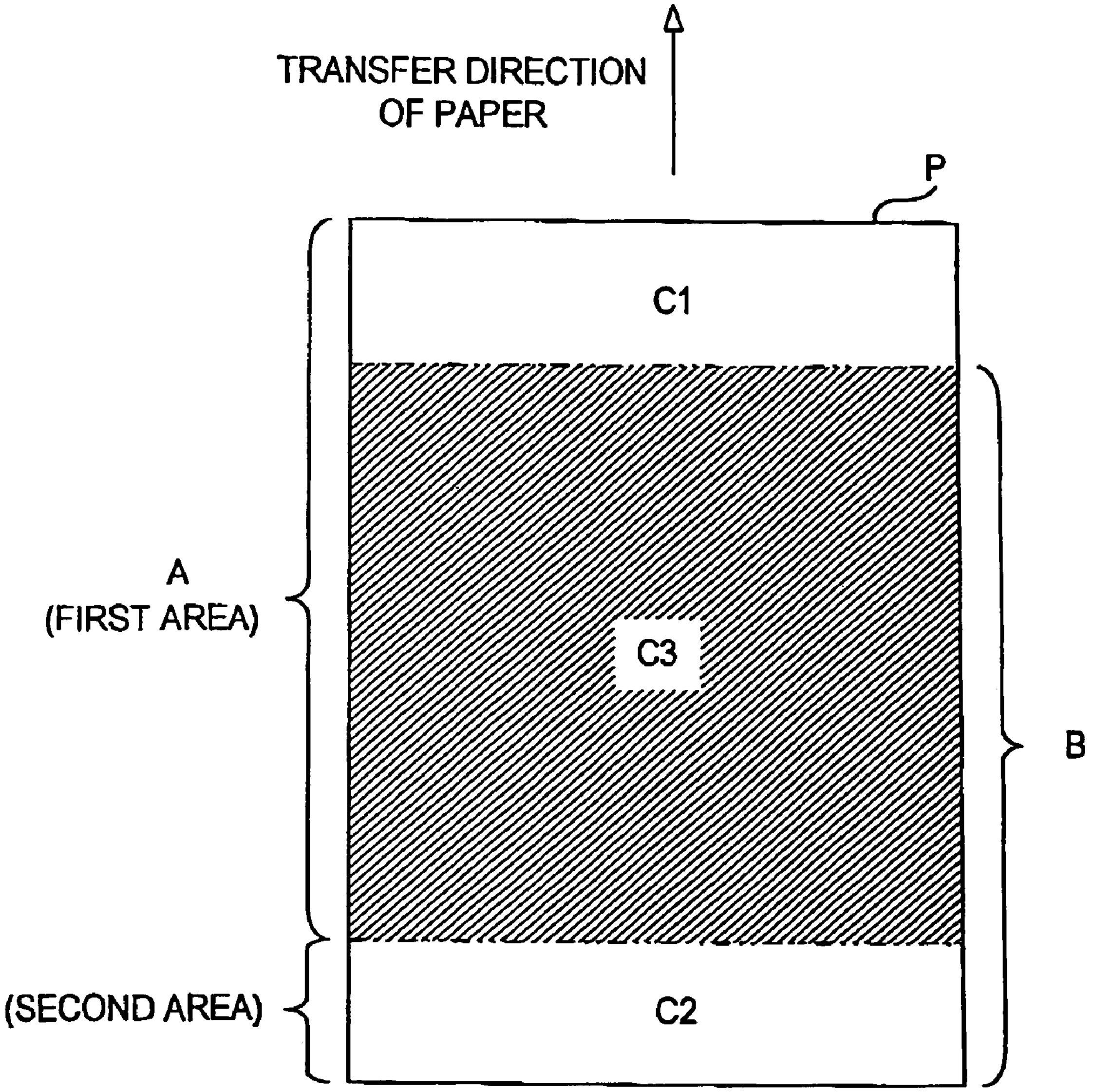
FIG. 10 is an explanatory view showing a space in a paper in which an image is printed.

That is, as shown in FIG. 10, there exist an area A in which the LF roller 18 transfers the paper P (area in which the paper P is capable of being transferred by the LF roller 18) and an area B in which the exit roller 20 transfers the paper P (area in which the paper P is capable of being transferred by the exit roller 20) in a space on the paper P in which the image is printed. These areas partially overlap with each other. Thereby, the space on the paper P in which the image is printed is divided into three areas, that is, an area C1 in which the paper P is transferred only by the LF roller 18 (front-end area of the paper P in the transfer direction), an area C2 in which the paper P is transferred by only the exit roller 20 (rear-end area of the paper P in the transfer direction), and an area C3 in which the paper P is transferred by both of the LF roller 18 and exit roller 20 (center area of the paper P in the transfer direction). Among the above areas, the area C1 in which the paper P is transferred by the LF roller 18 and the area C3 in which the paper P is transferred by both of the LF roller 18 and exit roller 20 constitute an area in which the transfer amount of the paper P is determined by the LF roller 18 (hereinafter, referred to as a first area), and the area in which the paper P is transferred only by the exit roller 20 constitutes an area in which the transfer amount of paper P is determined by the exit roller 20 (hereinafter, referred to as a second area). The second area is an area in the rear end of the paper P which occupies nearly the same length of space as a distance between the LF roller 18 and the exit roller 20. Accordingly, the second area is narrow in the secondary scanning direction compared to the first area occupying the remaining space of the paper P.

The control device 52, when it makes the LF roller 18 and exit roller 20 transfer the paper P, provides the transfer amount (rotation pulse number) to the drive circuit 36. The drive circuit 36 activates the paper transfer motor 34 in such a way that the LF roller 18 and exit roller 20 are rotated at an angle which corresponds to the transfer amount (hereinafter, referred to as a reference transfer amount) provided by the control device 52.

At this time, the control device 52 does not directly set an amount of the paper P to be transferred (hereinafter, referred to as a target transfer amount) to the reference transfer amount, but executes a transfer amount correction process which sets a corrected target transfer amount to the reference transfer amount. Particularly, a correction value 50*a* for LF roller 18 for correcting the transfer amount of the LF roller 18 and a correction value 50*b* for exit roller 20 for correcting the transfer amount of the exit roller 20 are stored in the EEPROM 50. Each of the respective correction values represents a correction transfer amount (correction pulse number) required per a unit transfer amount, The control device 52 provides to the drive circuit 36 a value obtained by correcting the target transfer amount with the correction value 50*a* for LF roller 18 as the reference transfer amount when it makes the LF roller 18 transfer the paper P, and provides to the drive circuit 36 a value obtained by correcting the target transfer amount with the correction value 50*b* for exit roller 20 as the reference transfer amount when it makes the exit roller 20 transfer the paper P. The correction values 50*a* and 50*b* for LF roller 18 and exit roller are initially set to 0.

Figure 4:
FIG. 4 is an explanatory view of a test pattern sequence.

The ink jet printer 10 prints a test pattern sequence composed of seven test pattern images sequentially numbered from [1] to [7] on the paper P in the primary scanning direction as shown in FIG. 4, when a predetermined input operation for printing the test pattern images on the paper P (hereinafter, referred to as a test pattern print operation) is conducted by way of the input keys on the operation panel 30. FIG. 4 is an emphatic view of the actual test pattern images [1] to [7], which show how the image varies depending on the transfer amount of the paper P.

Figure 5:
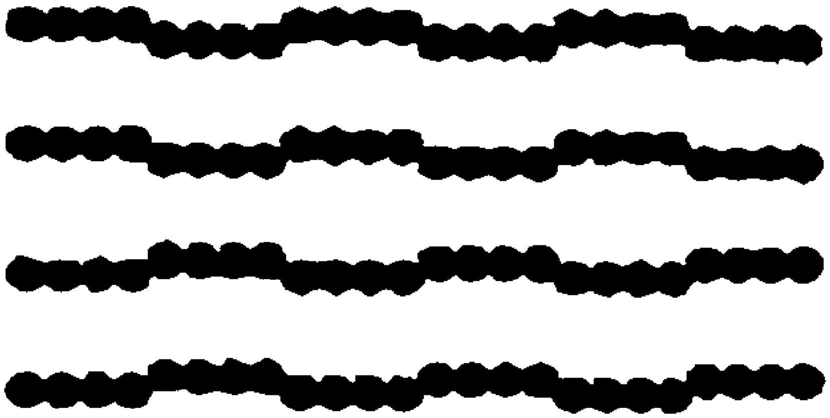
FIG. 5 is an explanatory view of a first pattern image.
Figure 6:
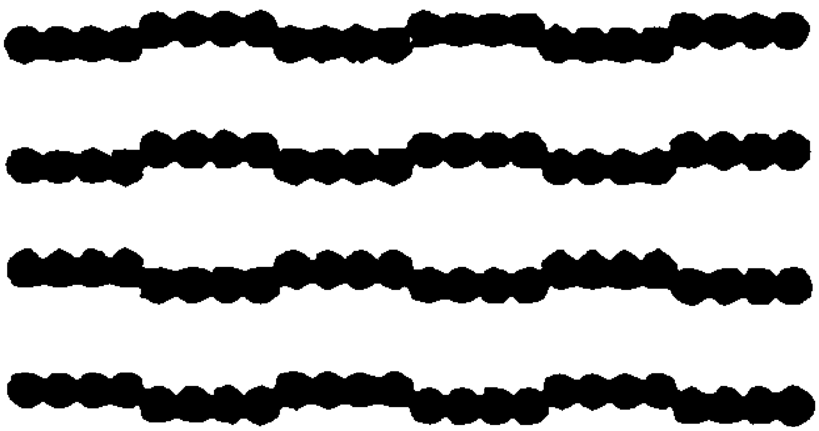
FIG. 6 is an explanatory view of a second pattern image.

Here, each of the test pattern images is composed of a first pattern image as shown in FIG. 5 and a second pattern image as shown in FIG. 6. In the test pattern images, the first and second pattern images are printed with various transfer amounts of the paper P. Patterns which appear in the printed test pattern images vary depending on a positional relation between the first pattern image and the second pattern image. The test pattern sequence is a series of test pattern images in which the positional relations between the first pattern image and the second pattern image in the secondary scanning direction are gradually different from each other. FIGS. 5 and 6 are enlarged views of the first and second pattern images, respectively, for the sake of easy understanding.

Figure 7:
FIG. 7 is an explanatory view of a reference image.

If the transfer amount of the paper P at the time the test pattern sequence is printed is appropriate, a black strip-like image (hereinafter, referred to as a reference image) as shown in FIG. 7 appears in the middle test pattern image (serial number [4] of FIG. 4). On the other hand, if the transfer amount of the paper P is less or more than appropriate, the positional relation between the first and second pattern images composing the respective test pattern images is changed, and the position in which the reference image (or an image similar to the same) appears is also changed. Accordingly, an error in the transfer amount of the LF roller 18 is reflected in the test pattern images lined up in the primary scanning direction printed in the first area of the paper P, and an error in the transfer amount of the exit roller 20 is reflected in the test pattern images lined up in the primary scanning direction printed in the second area of the paper P. In the present embodiment, the test pattern image looks like a checkered pattern from a microscopic viewpoint, if the transfer amount of the paper P when the test pattern sequence is printed is not appropriate.

Figure 8:
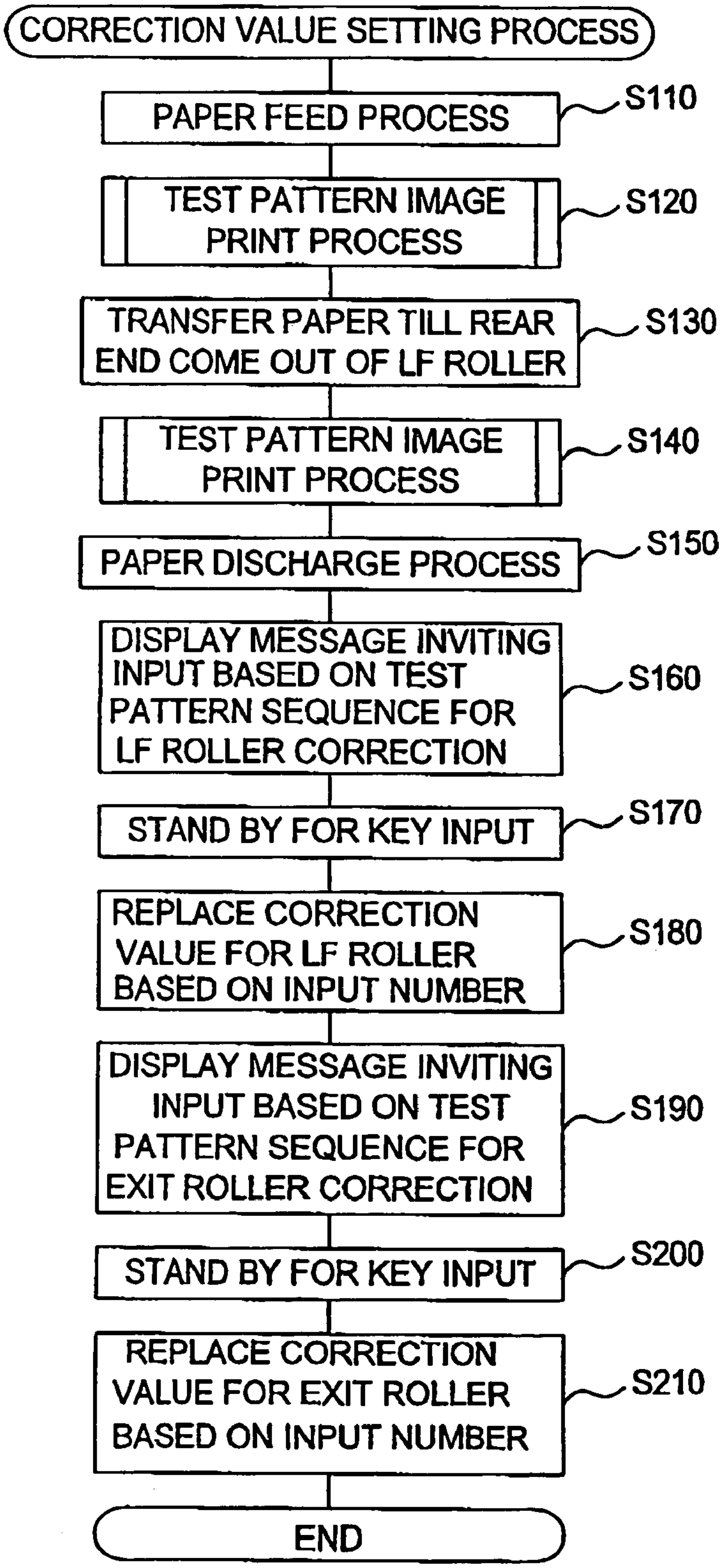
FIG. 8 is a flowchart of a correction value setting process.

Next, a correction value setting process performed by the CPU 44 of the control device 52 is explained by way of a flowchart of FIG. 8. In the correction value setting process, the above test pattern images are printed on the paper P and the transfer amount of the paper P is adjusted to an optimal value. The correction value setting process is started when the test pattern print operation is performed.

When this correction value setting process is started, the CPU 44 rotates the respective rollers 16, 18, 20 to transfer the paper P on the paper tray 12 to a position in which the test pattern sequence in the primary scanning direction is printed in the first area in step S110.

In step S120, the CPU 44 executes a test pattern print process for printing the test pattern sequence in the primary direction in the first area of the paper P. Detailed description of this test pattern print process will follow later.

In step S130, the CPU 44 rotates the respective rollers 18, 20 to transfer the paper P to a position in which the test pattern sequence is printed in the second area (position in which the rear end of the paper P comes out of the LF roller 18).

In step S140, the CPU 44 executes the test pattern image print process for printing the test pattern sequence in the primary direction in the second area of the paper P, as in S120.

In step S150, the CPU 44 rotates the exit roller 20 to transfer the paper P onto the not shown exit tray. As a result, the paper P on which the test pattern sequences in the primary scanning direction are printed in two rows spaced in the secondary scanning direction is discharged. That is, a test pattern sequence in the primary scanning direction is printed in the first and second areas of the paper P, respectively.

In step S160, a message which invites an input of the number of the test pattern image which most closely resembles the reference image (FIG. 7) in the test pattern sequence printed in the first area of the paper P in step S120 (test pattern sequence reflecting the error of the transfer amount of the LF roller 18) is displayed on the display of the operation panel 30. Since the test pattern sequences are printed in two rows on the paper P, it is preferable that a legend as well is printed on the paper, which indicates that the test pattern sequence in the first area printed in step S120 is for correction of the LF roller 18 and that the test pattern sequence in the second area printed in step S140 is for correction of the exit roller 20, so that the test pattern sequences in the respective rows can be distinguished from each other.

In step S170, the CPU 44 stands by until the input by an operator using the input keys of the operation panel 30 (corresponding to the first input operation) is received. When the CPU 44 receives the input, the process moves to step S180 and the correction value 50*a* for LF roller 18 stored in the EEPROM 60 is replaced with an optimal value based on the inputted number. That is, as mentioned above, if there is an error (over and short) in the transfer amount of the paper P, the position in which the reference image appears varies depending on the degree of error. Therefore, it is possible to determine the degree of error in the transfer amount based on the position in which the reference image appears, and set the optimal correction value based on the inputted number.

In step S190, a message which invites an input of the number of the test pattern image which most closely resembles the reference image, in the test pattern sequence printed in the second area of the paper P in step S140 (test pattern sequence reflecting the error of the transfer amount of the exit roller 20) is displayed on the display of the operation panel 30.

In step S200, the CPU 44 stands by until the input by the operator using the input keys of the operation panel 30 (corresponding to the second input operation) is received. When the CPU 44 receives the input, the process moves to step S210 and the correction value 50*b* for exit roller 20 stored in the EEPROM 50 is replaced with an optimal value based on the inputted number.

Figure 9:
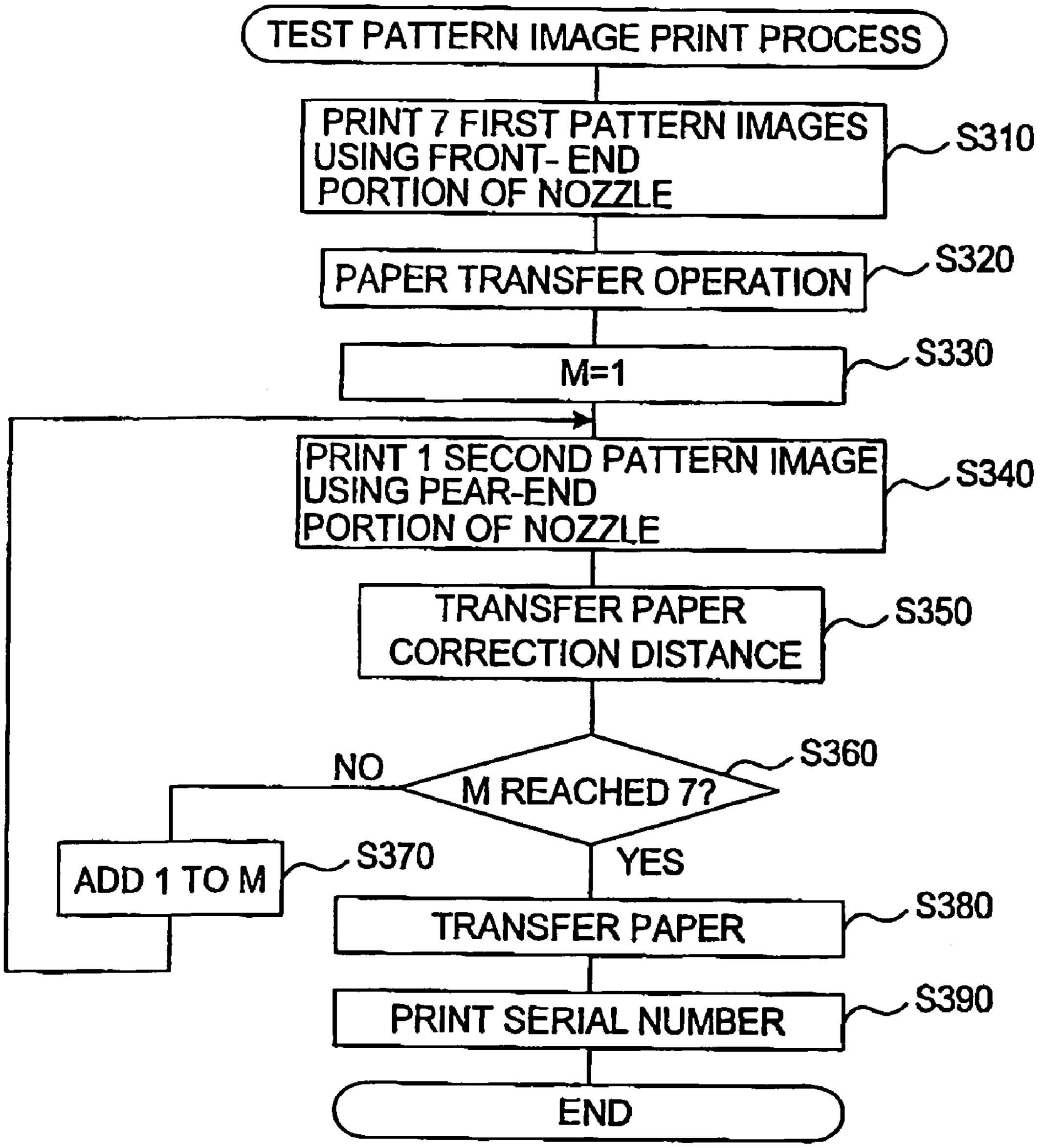
FIG. 9 is a flowchart of a test pattern image print process.

Next, the test pattern image print process executed in steps S120 and S140 of the aforementioned correction value setting process is explained by way of a flowchart of FIG. 9.

When this test pattern image print process is started, the CPU 44 drives the record head 22 and carriage motor 38 to print seven first pattern images (FIG. 5) side by side on the paper P in the primary direction successively. The paper P is not transferred while the seven first pattern images are being printed. The printing of the first pattern images is performed using a portion on the upstream side in the transfer direction (hereinafter, referred to as a front-end portion) of the nozzle group 22*b* of the record head 22. In the present embodiment, a black ink is used when the test pattern images are printed. However, inks of other colors can be also used as long as they can be observed visually.

In step S320, the paper P is transferred a predetermined transfer distance. The transfer distance can be obtained from an Expression (1) below.

$$\text{transfer distance}=\text{nozzle length}-\text{print width}-\text{correction distance}\times(n-1)/2 \qquad \text{Expression (1):}$$

In the Expression (1), the nozzle length represents a length of the nozzle group 22*b* in the transfer direction of the paper P, that is, a distance between the nozzles 22*a* on both ends of the respective rows of the nozzles. The print width represents a length of the front-end portion of the nozzle group 22*b* in the transfer direction of the paper P, that is, a distance between the nozzles 22*a* on both ends in the front-end portion used for printing the first pattern image. The correction distance represents the transfer amount of the paper P in step S360 which will be described later. The n represents a number of the test pattern images constituting the test pattern sequence. In the present embodiment, it is assumed that n=7.

In step S380, a value in a counter M is set to 1.

In step S340, the CPU 44 drives the record head 22 and carriage motor 38 to print one single second pattern image (FIG. 6) on the paper P. The printing of the second pattern image is performed using a portion on the downstream side in the transfer direction (hereinafter, referred to as a rear-end portion) of the nozzle group 22*b* of the record head 22. Here, the moving direction of the record head 22 when the second pattern image is printed on the paper P is set to be the same moving direction of the record head 22 when the first pattern images were printed on the paper P in step S310 (for example, direction from left to right). A print position of the second pattern image in the primary direction is set to the position of the $M^{th}$ image from the left (sequential number M) in the seven first pattern images printed in step S310. The length of the rear-end portion of the nozzle group 22*b* which prints the second image in the transfer direction of the paper P, that is, the distance between the nozzles 22*a* on both ends in the rear-end portion used to print the second image is the same as the above print width.

In step S350, the paper P is transferred the above correction distance.

In step S360, it is determined whether the value in the counter M has reached 7.

If it is determined that the value in the counter M has not reached 7 in step S360, the process moves to step S370 to increment the value in the counter M by one. Then the process returns to step S340.

On the other hand, if it is determined that the value in the counter M has reached 7 in step S360, the process moves to step S380 to transfer the paper P a predetermined distance. After serial numbers ([1] to [7]) are printed on the paper P in step S390, the test pattern image print process is ended.

Next, a function of the ink jet printer 10 is described.

When the operator who intends to correct the error in the transfer amount of the LF roller 18 and exit roller 20 executes the predetermined test pattern print operation using the input keys on the operation panel 30, a test pattern sequence is printed in each of the first and second areas on the paper P (S110-150). Then, the message for making the operator input the number of the test pattern image which most closely resembles the reference image in the test pattern sequence for LF roller correction is displayed on the display of the operation panel 30 in the ink jet printer 10 (S160).

The operator observes and determines which number of the test pattern image most closely resembles the reference image, referring to the test pattern sequence for LF roller correction printed on the paper P, and inputs the corresponding number using the input keys on the operation panel 30. In the ink jet printer 10, the correction value 50*a* for LF roller 18 stored in the EEPROM 50 is replaced with the optimal value based on the inputted number (S110, S180).

Subsequently, in the ink jet printer 10, the message for making the operator input the number of the test pattern image which most closely resembles the reference image in the test pattern sequence for exit roller correction is displayed on the display of the operation panel 30 (S190).

Similarly, the operator observes and determines which test pattern image most closely resembles the reference image, referring to the test pattern sequence for exit roller correction printed on the paper P, and inputs the corresponding number using the input keys on the operation panel. In the ink jet printer 10, the correction value 50*b* for exit roller 20 stored in the EEPROM 50 is replaced with the optimal value based on the inputted number (S200, S210).

Thereby, in the print process hereafter, the transfer amount correction process is transferred out using the correction values after the replacement.

As in the above, the ink jet printer 10 of the present embodiment ensures correction of the transfer amount of the paper P without an image read apparatus such as a scanner. Especially, since the test pattern images are printed side by side in the primary scanning direction on the paper P, the test pattern sequence can be printed also within the second area which is narrow in the secondary scanning direction. As a result, it is possible to print the test pattern sequence for exit roller correction in one sheet of paper P. In addition, since the test pattern sequence for LF roller correction is also printed on the same sheet of paper P, saving of paper is enhanced.

Furthermore, time required for printing the test pattern sequence can be reduced since the first pattern images comprised in the seven test pattern images are printed in one pass.

Moreover, it is easy to observe and determine the degree of misalignment since the patterns of the test pattern images vary depending on the degree of gap or overlap of the first and second pattern images.

Since the test pattern sequences are printed using the front-end and rear-end portions of the nozzle group 22*b*, the correction of the transfer amount can be done taking into account the error in the nozzle length as well.

Also, since the moving directions of the record head 22 are the same when the first and second pattern images are printed respectively, the precision of printing the test pattern image is improved.

In the above, one embodiment of the present invention has been described. However, other modifications and variations may be possible without departing from the technical scope of the invention.

For instance, in the ink jet printer 10 of the above embodiment, one test pattern sequence is printed for each of the LF roller 18 and exit roller 20, and the transfer amount is corrected based on the test pattern sequence. However, it is also preferable that a plurality of test pattern sequences are printed in each of the first and second areas on the paper P in different phases of the rollers 18, 20, and the transfer amount may be corrected based on the plurality of test pattern sequences. This is because, in case that rotation shafts of the LF roller 18 and exit roller 20 are eccentric, the transfer amounts may differ according to rotation positions.

Figure 11:
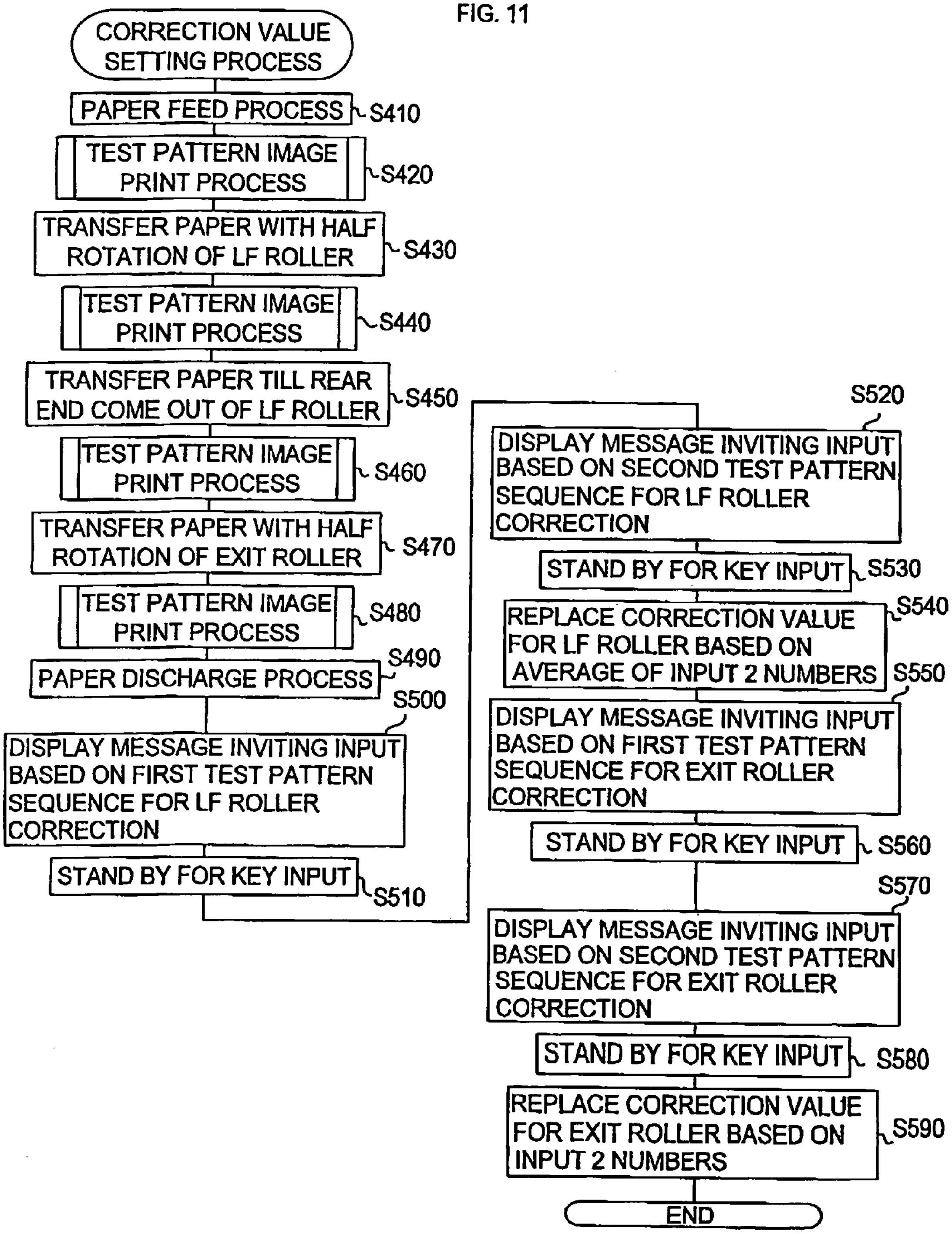
FIG. 11 is a flowchart of the correction value setting process when the test pattern images are printed in different phases of a roller.

Particularly, to realize the above, a correction value setting process shown in FIG. 11 is executed instead of the correction value setting process (FIG. 8) of the above embodiment.

That is, when this correction value setting process is started, the CPU 44 rotates the respective rollers 16, 18, 20 to transfer the paper P on the paper tray 12 to a position in which the test pattern sequence in the primary direction can be printed in the first area of the paper P in step S410.

In step S420, the aforementioned test pattern image print process (FIG. 9) for printing the test pattern sequence in the primary direction in the first area of the paper P is executed.

In step S430, the paper P is transferred by a half rotation of the LF roller 18 (180° rotation), and in step S440, the test pattern image print process is executed again.

In step S450, the CPU 44 rotates the respective rollers 18, 20 to transfer the paper P to a position in which the test pattern sequence can be printed in the second area (position in which the rear end of the paper P comes out of the LF roller 18).

In step S460, as is the case with step S420, the test pattern image print process for printing the test pattern image in the primary direction in the second area of the paper P is executed.

In step S470, the paper P is transferred by a half rotation of the exit roller 20, and the test pattern image print process is executed again in step S480.

In step S490, the CPU 44 rotates the exit roller 20 to transfer the paper P onto the not shown exit tray. As a result, the paper P on which the test pattern sequences in the primary scanning direction disposed in two rows spaced in the secondary scanning direction are printed in two areas is discharged. That is, two rows of test pattern sequences in the primary scanning direction are printed in the first and second areas of the paper P, respectively.

In step S500, a message which invites an input of the number of the test pattern image which most closely resembles the reference image (FIG. 7) in the test pattern sequence printed in the first area on the paper P (hereinafter, referred to as a first test pattern sequence for LF roller correction) in step S420 is displayed on the display of the operation panel 30.

In step S510, the CPU 44 stands by until the input by the operator is received using the input keys of the operation panel 30. When the operator performs the input operation, the process moves to step S520 and a message which invites an input of the number of the test pattern image which most closely resembles the reference image in the test pattern sequence printed in the second area of the paper P (hereafter, referred to as a second test pattern sequence for LF roller correction) in step S440 is displayed on the display of the operation panel 30.

In step S630, the CPU 44 stands by until the input by the operator using the input keys of the operation panel 30 is received. When the operator performs the input operation, the process moves to step S540, and the correction value 50*a* for LF roller 18 stored in the EEPROM 50 is replaced with the optimal value based on an average value of the number inputted with respect to the first test pattern sequence for LF roller correction and the number inputted with respect to the second test pattern sequence for LF roller correction.

In step S550, as is the case with the above step S500, a message which invites an input of the number of the test pattern image which most closely resembles the reference image in the test pattern sequence printed in the second area of the paper P (hereinafter, referred to as a first test pattern sequence for exit roller correction) in step S460 is displayed on the display of the operation panel 30.

In step S560, the CPU 44 stands by until the input by the operator using the input keys of the operation panel 80 is received. When the operator performs the input operation, the process moves to step S570 and a message which invites an input of the number of the test pattern image which most closely resembles the reference image in the test pattern sequence printed in the second area of the paper P (hereafter, referred to as a second test pattern sequence for exit roller correction) in step S480 is displayed.

In step S580, the CPU 44 stands by until the input by the operator using the input keys of the operation panel 30 is received. When the operator performs the input operation, the process moves to step S590, and the correction value 50*b* for LF roller 18 stored in the EEPROM 50 is replaced with the optimal value based on an average value of the number inputted with respect to the first test pattern sequence for exit roller correction and the number inputted with respect to the second test pattern sequence for exit roller correction.

In this manner, even if the rotation shafts of the rollers 18, 20 are eccentric, appropriate correction can be done. It is also possible to print three rows of test pattern sequences having intervals of 120° rotation of the rollers 18, 20. The more number of rows of test pattern sequences are printed, the more appropriate correction can be made.

In the ink jet printer 10 of the above embodiment, the test pattern images having serial numbers of [1] to [7] are printed on the paper P, and the input of the serial number is invited. However, the test pattern images having numbers like [1], [3], [5], . . . may be printed on the paper P, and the ink jet printer 10 may be designed to accept not only the printed numbers but the intermediate numbers (such as [2], [4]). The correction based on not only the serial numbers but also the intermediate numbers allows more precise correction.

In the above embodiment, the test pattern image composed of the first pattern image (FIG. 5) and second pattern image (FIG. 6) is used as an example. However, the test pattern image can be generated by narrowing the interval in the secondary direction between the first and second pattern images so that the higher the degree of misalignment may be, the clearer checkered pattern emerges. The test pattern image may be generated in such a way that the degree of misalignment can be determined by change of colors.

What is claimed is:

1. An image forming apparatus provided with a transfer unit and a record head having a plurality of record elements arranged thereon for recording dots on a recording material, the apparatus forming an image on the recording material based on a transfer operation for making the transfer unit transfer the recording material and a move operation for making the record head travel to a direction orthogonal to a transfer direction of the recording material, the image forming apparatus comprising:

a record control unit that controls the transfer unit and record head to record on the recording material a plurality of test pattern images arranged side by side in a moving direction of the record head, each of the test pattern image being composed of a first pattern image and a second pattern image, wherein an amount of the recording material transferred by the transfer unit between recordings of the first pattern image and the second pattern image differs in each of the plurality of test pattern images.

2. The image forming apparatus as set forth in claim 1 wherein the record control unit records the first pattern images comprised in the plurality of test pattern images without the transfer operation for transferring the recording material.

3. The image forming apparatus as set forth in claim 1 wherein the record control unit records the first pattern image using a first part of the record elements of the record head, and the second pattern image using a second part of the record elements which is different in position in the transfer direction of the recording material from the first part of the record elements.

4. The image forming apparatus as set forth in claim 3 wherein the first part and the second part correspond to respective end parts of the record elements of the record head in the transfer direction of the recording material.

5. The image forming apparatus as set forth in claim 1 wherein the record elements of the record head eject ink drops on the recording material to record dots, and the record control unit record the test pattern image on the recording material only when the record head is moved to one predetermined direction.

6. The image forming apparatus as set forth in claim 1. wherein the test pattern image varies its pattern according to the amount transferred by the transfer unit between recordings of the first pattern image and the second pattern image.

7. The image forming apparatus as set forth in claim 1 further comprising:

an input unit that inputs a result of visual comparison between the respective test pattern images recorded on the recording material; and a correction unit that corrects the amount of the recording material transferred by the transfer unit based on the comparison result inputted from the input unit.

8. The image forming apparatus as set forth in claim 7 wherein the transfer unit comprises an upstream transfer roller that transfers the recording material on an upstream side of the record head and a downstream transfer roller that transfers the recording material on a downstream side of the record head, the record control unit records the plurality of test pattern images in an area in which the recording material is transferred only by the downstream transfer roller, and the correction unit corrects the amount transferred by the downstream transfer roller.

9. The image forming apparatus as set forth in claim 8 wherein the record control unit records the plurality of test pattern images in an area in which the recording material is transferred by one of only the upstream transfer roller and both of the upstream and downstream transfer rollers, and the correction unit comprises a first correction unit that corrects the amount transferred by the upstream transfer roller based on a first input operation and a second correction unit that corrects the amount transferred by the downstream transfer roller based on a second input operation.

10. The image forming apparatus as set forth in claim 1 wherein the transfer unit comprises a transfer roller that transfers the recording material, and the record control unit records the test pattern images at least in two rows in the transfer direction of the recording material in different phases of the transfer roller.

11. A recording method of test pattern images in an image forming apparatus provided with a transfer unit and a record head having a plurality of record elements arranged thereon for recording dots on a recording material, the apparatus forming an image on the recording material based on a transfer operation for making the transfer unit transfer the recording material and a move operation for making the record head travel to a direction orthogonal to a transfer direction of the recording material, the method comprising a step of:

controlling the transfer unit and record head to record on the recording material a plurality of test pattern images arranged side by side in a moving direction of the record head, each of the test pattern image being composed of a first pattern image and a second pattern image, wherein an amount of the recording material transferred by the transfer unit between recordings of the first pattern image and the second pattern image differs in each of the plurality of test pattern images.

12. A correction method of a transfer amount of a recording material in an image forming apparatus provided with a transfer unit and a record head having a plurality of record elements arranged thereon for recording dots on a recording material, the apparatus forming an image on the recording material based on a transfer operation for making the transfer unit transfer the recording material and a move operation for making the record head travel to a direction orthogonal to a transfer direction of the recording material, the method comprising steps of:

controlling the transfer unit and record head to record on the recording material a plurality of test pattern images arranged side by side in a moving direction of the record head, each of the test pattern image being composed of a first pattern image and a second pattern image;

inputting a result of visual comparison between the respective test pattern images recorded on the recording material; and correcting the amount of the recording material transferred by the transfer unit based on the comparison result inputted from the input unit, wherein the amount transferred by the transfer unit between recordings of the first pattern image and the second pattern image differs in each of the plurality of test pattern images.

* * * * *